United States Patent
Wang et al.

(10) Patent No.: US 11,303,619 B2
(45) Date of Patent: Apr. 12, 2022

(54) ENCAPSULATED ENCRYPTED PACKET HANDLING FOR RECEIVE-SIDE SCALING (RSS)

(71) Applicant: VMware, Inc., Palo Alto, CA (US)

(72) Inventors: Dexiang Wang, Sunnyvale, CA (US); Yong Wang, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 126 days.

(21) Appl. No.: 16/893,450

(22) Filed: Jun. 5, 2020

(65) Prior Publication Data

US 2021/0385203 A1    Dec. 9, 2021

(51) Int. Cl.

| | |
|---|---|
| *H04L 29/06* | (2006.01) |
| *H04L 9/06* | (2006.01) |
| *G06F 16/22* | (2019.01) |
| *H04L 69/22* | (2022.01) |
| *H04L 69/16* | (2022.01) |
| *H04L 69/326* | (2022.01) |
| *G06F 9/455* | (2018.01) |

(52) U.S. Cl.
CPC ...... *H04L 63/0485* (2013.01); *G06F 9/45558* (2013.01); *G06F 16/2255* (2019.01); *H04L 9/0643* (2013.01); *H04L 63/029* (2013.01); *H04L 63/166* (2013.01); *H04L 69/16* (2013.01); *H04L 69/22* (2013.01); *H04L 69/326* (2013.01); *G06F 2009/45595* (2013.01)

(58) Field of Classification Search
CPC .................................................. H04L 63/0485
See application file for complete search history.

(56) References Cited

U.S. PATENT DOCUMENTS

| | | | | |
|---|---|---|---|---|
| 5,303,293 | A | * | 4/1994 | Bettenhausen ..... H04L 63/0485 380/2 |
| 6,101,543 | A | * | 8/2000 | Alden ............... H04L 29/12028 709/225 |
| 10,498,708 | B2 | * | 12/2019 | Wang .................. H04L 63/0485 |

(Continued)

OTHER PUBLICATIONS

Non-Published U.S. Appl. No. 16/514,647 (F094), filed Jul. 17, 2019.

(Continued)

*Primary Examiner* — Ponnoreay Pich
(74) *Attorney, Agent, or Firm* — Su IP Consulting

(57) ABSTRACT

Example methods and computer systems for encapsulated encrypted packet handling for receive-side scaling (RSS). One example may comprise a first computer system performing encryption and encapsulation on a first inner packet to generate a first encapsulated encrypted packet that includes (a) a first security protocol header and (b) a first outer header configured based on a first security association (SA). The first encapsulated encrypted packet may be forwarded to cause receive-side processing using a first core of a second computer system based on the first outer header. The first computer system may further perform encryption and encapsulation on a second inner packet to generate a second encapsulated encrypted packet that includes (a) a second security protocol header (b) a second outer header configured based on a second SA. The second encapsulated encrypted packet may be forwarded to cause receive-side processing using a second core based on the second outer header.

21 Claims, 6 Drawing Sheets

(56) References Cited

U.S. PATENT DOCUMENTS

| | | |
|---|---|---|
| 10,623,372 B2 | 4/2020 | Wang et al. |
| 10,701,107 B2 | 6/2020 | Gopal et al. |
| 2018/0069924 A1* | 3/2018 | Tumuluru ............. G06F 9/5077 |
| 2019/0036894 A1* | 1/2019 | Wang .................... H04L 63/166 |
| 2019/0173841 A1* | 6/2019 | Wang ................. H04L 63/0428 |
| 2019/0173850 A1 | 6/2019 | Jain et al. |
| 2019/0173851 A1 | 6/2019 | Jain et al. |
| 2021/0136049 A1* | 5/2021 | Wang ................... H04L 63/164 |
| 2021/0185025 A1* | 6/2021 | Wang ..................... G06F 9/505 |

OTHER PUBLICATIONS

Mon-Published U.S. Appl. No. 16/450,026 (F235), filed Jun. 24, 2019.
Mon-Published U.S. Appl. No. 16/802,580 (F410), filed Feb. 27, 2020.
Mon-Published U.S. Appl. No. 16/016,360 (F582), filed Jun. 22, 2018.

* cited by examiner

ENCAPSULATED ENCRYPTED PACKET HANDLING FOR RECEIVE-SIDE SCALING (RSS)

BACKGROUND

Virtualization allows the abstraction and pooling of hardware resources to support virtual machines in a Software-Defined Networking (SDN) environment, such as a Software-Defined Data Center (SDDC). For example, through server virtualization, virtual machines (VMs) running different operating systems may be supported by the same physical machine (e.g., referred to as a "host"). Each VM is generally provisioned with virtual resources to run an operating system and applications. Further, through SDN, benefits similar to server virtualization may be derived for networking services. For example, logical overlay networks may be provisioned, changed, stored, deleted and restored programmatically without having to reconfigure the underlying physical hardware architecture. In practice, network device(s) may be deployed in the SDN environment to perform packet processing to facilitate communication among endpoints, such as VMs, etc. However, existing approaches for handling encapsulated encrypted packets may lack efficiency.

DETAILED DESCRIPTION

Figure 1:
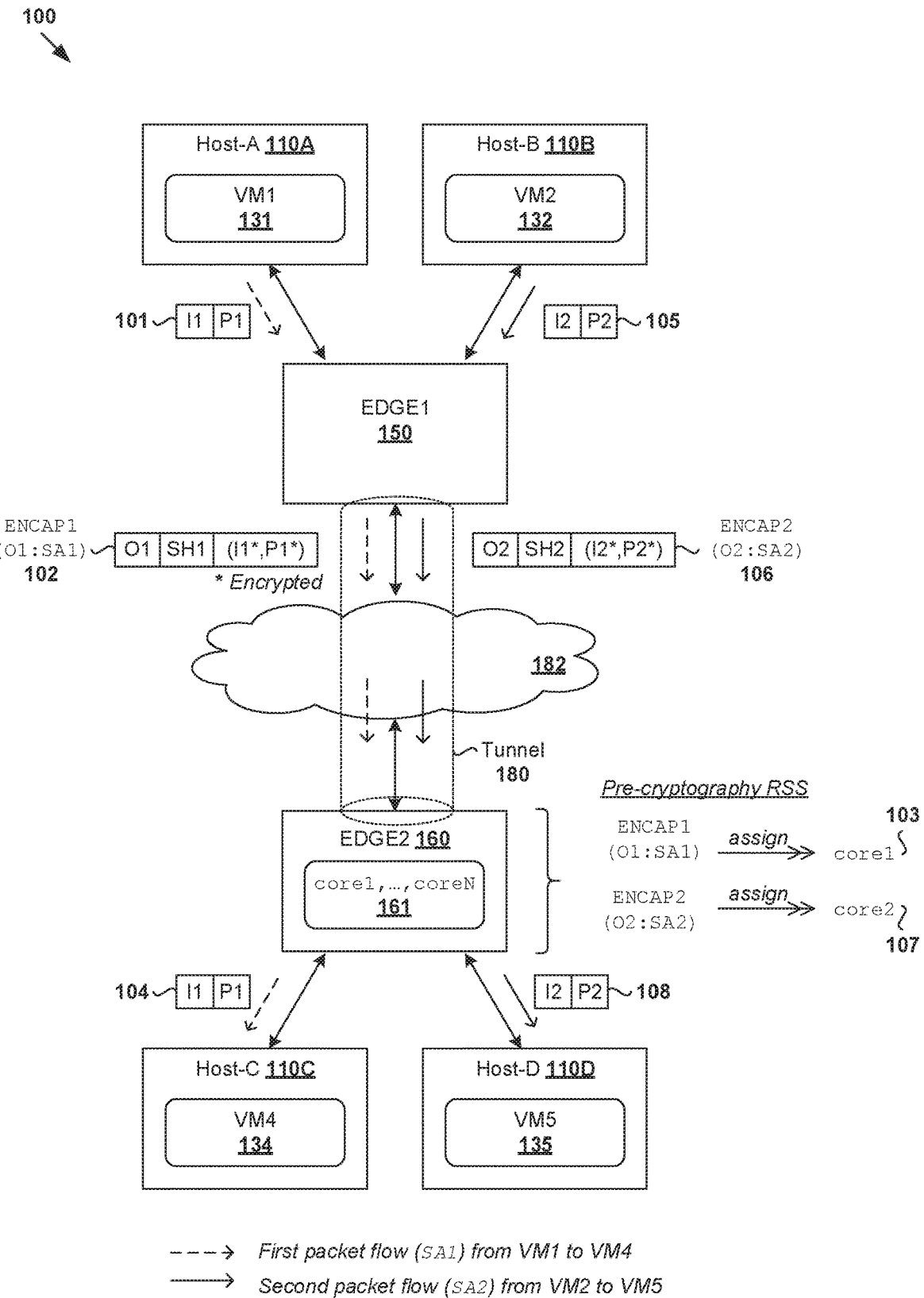
FIG. 1 is a schematic diagram illustrating an example software-defined networking (SDN) environment in which encapsulated encrypted packet handling for receive-side scaling (RSS) may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Figure 2:
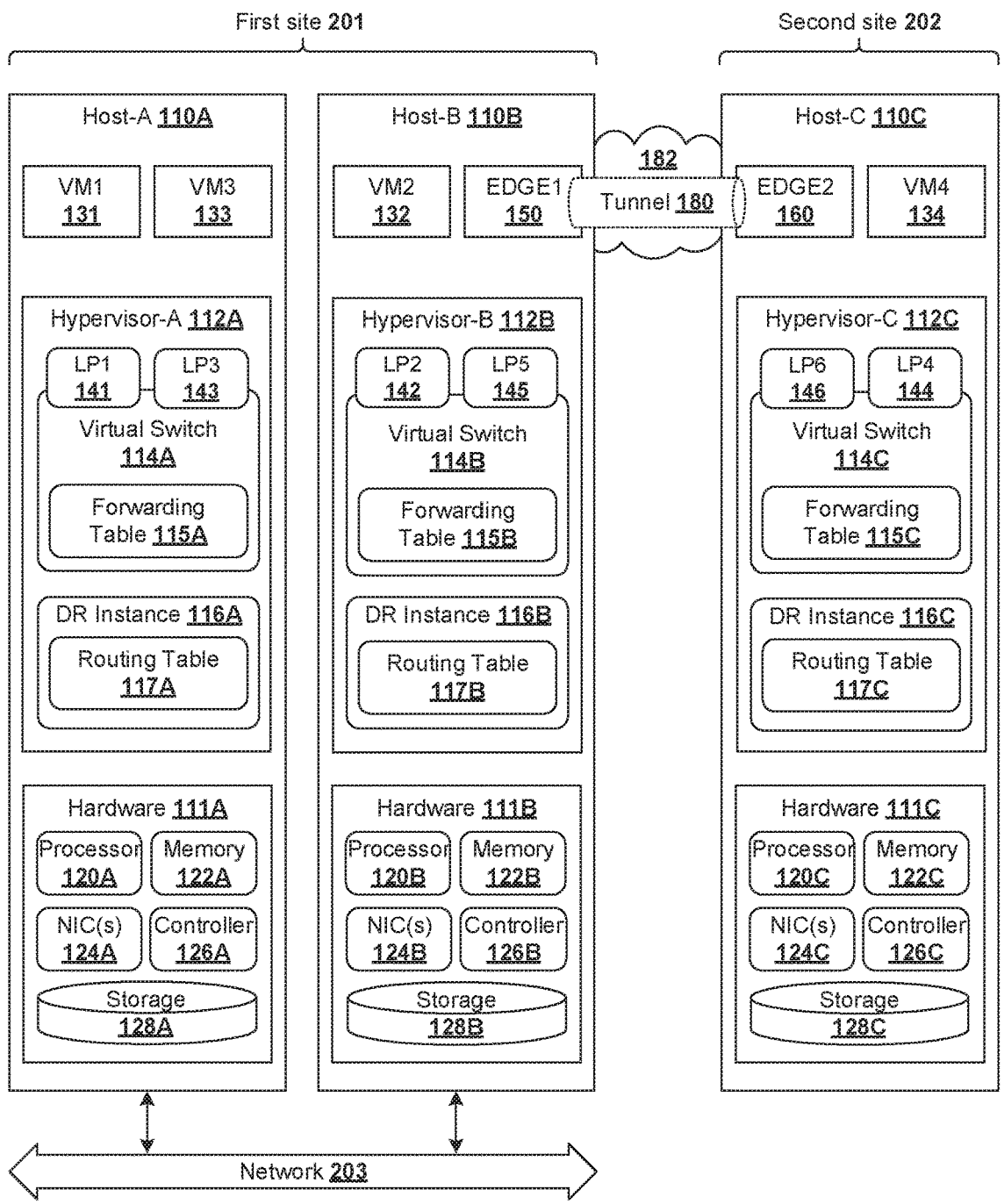
FIG. 2 is a schematic diagram illustrating an example physical view of the SDN environment in FIG. 1.

FIG. 1 is a schematic diagram illustrating example software-defined networking (SDN) environment 100 in which encapsulated encrypted packet handling for receive-side scaling may be performed. FIG. 2 is a schematic diagram illustrating example physical view 200 of SDN environment 100 in FIG. 1. It should be understood that, depending on the desired implementation, SDN environment 100 may include additional and/or alternative components than that shown in FIG. 1 and FIG. 2. In practice, SDN environment 100 may include any number of hosts (also known as "computer systems," "computing devices", "host computers", "host devices", "physical servers", "server systems", "transport nodes," etc.). Each host may be supporting any number of virtual machines (e.g., tens or hundreds).

Referring first to FIG. 1, SDN environment 100 includes multiple hosts, such as host-A 110A, host-B 110B and host-C 110C. In practice, hosts 110A-C may be located at geographically dispersed sites, such hosts 110A-B at a first site and hosts 110C-D at a second site. To facilitate communication among hosts 110A-D over physical network 182, EDGE1 150 may be deployed at the edge of the first site, and EDGE2 160 at the edge of the second site. Throughout the present disclosure, EDGE 150/160 may be an entity that is implemented using one or more virtual machines (VMs) and/or physical machines (also known as "bare metal machines") and capable of performing functionalities of a switch, router, bridge, gateway, edge appliance, any combination thereof, etc. In practice, EDGE 150/160 may implement a centralized service router (SR) to provide networking services such as firewall, load balancing, network address translation (NAT), intrusion detection, deep packet inspection, etc.

Referring also to FIG. 2, EDGE1 150 ("first computer system") and EDGE2 160 ("second computer system") may be VMs supported by respective host-B 110B and host-C 110C. Hosts 110A-C may each include suitable hardware and virtualization software (e.g., hypervisors 112A-C) to support various VMs. For example, at the first site (see 201), host-A 110A supports VM1 131 and VM3 133, and host-B 110B supports EDGE1 150 and VM2 132. Hosts 110A-B may be connected via any suitable physical network 203. At the second site (see 202), host-C 110C supports EDGE2 160 and VM4 134, and host-D 110D supports VM5 135 (not shown in FIG. 2 for simplicity). In alternative implementations, EDGE1 150 and/or EDGE2 160 may be bare metal machines or supported by different hosts than that shown in FIG. 2.

Hypervisor 112A/112B/112C maintains a mapping between underlying hardware 111A/111B/111C and virtual resources allocated to the VMs. Hardware 111A/111B/111C includes various physical components, such as central processor(s) or processor(s) 120A/120B/120C; memory 122A/122B/122C; physical network interface controllers (NICs) 124A/124B/124C; and storage disk(s) 128A/128B/128C accessible via storage controller(s) 126A/126B/126C, etc. Virtual resources are allocated to each virtual machine to support a guest operating system (OS) and applications, such as virtual central processor (CPU), guest physical memory, virtual disk(s) and virtual network interface controller (VNIC). Hypervisor 112A/112B/112C further implements virtual switch 114A/114B/114C and logical distributed router (DR) instance 116A/116B/116C to handle egress packets from, and ingress packets to, respective VMs.

In practice, logical switches and logical distributed routers may be implemented in a distributed manner and can span multiple hosts 110A-C to connect the VMs. For example, a logical switch may be configured to provide logical layer-2 connectivity to VMs supported by different hosts. The logical switch may be implemented collectively by virtual switches 114A-C of respective hosts 110A-C and represented internally using forwarding tables (e.g., 115A-C) at the respective virtual switches 114A-C. Further, logical distributed routers that provide logical layer-3 connectivity may be implemented collectively by distributed router (DR) instances (e.g., 116A-C) of respective hosts 110A-C and represented internally using routing tables (e.g., 117A-C) at the respective DR instances. Routing tables 117A-C may be each include entries that collectively implement the respective logical distributed routers.

The VMs (e.g., VMs 131-134, 150 and 160) may send and receive packets via respective logical ports 141-146. As used herein, the term "logical port" may refer generally to a port on a logical switch to which a virtualized computing instance is connected. A "logical switch" may refer generally to an SDN construct that is collectively implemented by virtual switches of hosts 110A-C, whereas a "virtual switch" (e.g., 114A-C) may refer generally to a software switch or software implementation of a physical switch. In practice, there is usually a one-to-one mapping between a logical port on a logical switch and a virtual port on a virtual switch. However, the mapping may change in some scenarios, such as when the logical port is mapped to a different virtual port on a different virtual switch after migration of the corresponding virtualized computing instance (e.g., when the source and destination hosts do not have a distributed virtual switch spanning them).

Although examples of the present disclosure refer to virtual machines, it should be understood that a "virtual machine" running on a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The virtual machines may also be complete computational environments, containing virtual equivalents of the hardware and software components of a physical computing system.

As used herein, the term "hypervisor" may refer generally to a software layer or component that supports the execution of multiple virtualized computing instances, including system-level software in guest virtual machines that supports namespace containers such as Docker, etc. Hypervisors 114A-C may each implement any suitable virtualization technology, such as VMware ESX® or ESXi™ (available from VMware, Inc.), Kernel-based Virtual Machine (KVM), etc. The term "packet" may refer generally to a group of bits that can be transported together from a source to a destination, such as message, segment, datagram, etc. The term "traffic" may refer generally to a flow of packets. The term "layer 2" may refer generally to a Media Access Control (MAC) layer; "layer 3" to a network or Internet Protocol (IP) layer; and "layer-4" to a transport layer (e.g., using transmission control protocol (TCP) or user datagram protocol (UDP)) in the Open System Interconnection (OSI) model, although the concepts described herein may be used with other networking models.

Depending on the desired implementation, tunnel 180 may be established between EDGE1 150 and EDGE2 160. In practice, the second tunnel endpoint may be any other endpoint or non-edge router, not just EDGE2 160. Tunnel 180 may be established using any suitable tunneling protocol. For example, a Virtual Private Network (VPN) based on Internet Protocol Security (IPSec) may bridge traffic in a hybrid cloud environment between first site 201 (e.g., on-prem data center) and second site 202 (e.g., public cloud environment). In practice, IPSec is a secure network protocol suite that provides data authentication, integrity and confidentiality between a pair of entities (e.g., data centers, gateways) across an IP-based network. One example in the IPSec protocol suite is Encapsulating Security Payload (ESP), which provides origin authenticity using source authentication, data integrity and confidentiality through encryption protection for IP packets. Although various examples will be discussed using IPSec-based VPN, it should be understood that any alternative and/or additional security protocol(s) may be used.

In the example in FIG. 1, some example cross-site packet flows are shown. A first packet flow is between VM1 131 on host-A 110A and VM4 134 on host-C 110C. A second packet flow is between VM2 132 on host-B 110B and VM5 135 on host-D 110D. At the first site, EDGE1 150 may perform transmit-side processing by performing encryption and encapsulation on packets originating from source endpoints VM1 131 and VM2 132. At the second site, EDGE2 160 may perform receive-side processing by performing decryption and decapsulation before forwarding (decrypted) packets towards destination endpoints VM4 134 and VM5 135.

Conventionally, receive-side processing at EDGE2 160 may lack parallelism and efficiency. For example in FIG. 1, multiple security associations (SAs) may be negotiated between EDGE1 150 and EDGE2 160 to facilitate secure communication. Using a security protocol (e.g., IPSec), a first SA may be applicable to the first packet flow, and a SA to the second packet flow. However, according to conventional approaches, multiple packet flows may be assigned to the same core at EDGE2 160, which may lead to a bottleneck at EDGE2 160.

Receive-Side Scaling (RSS)

According to examples of the present disclosure, encapsulated encrypted packet handling may be improved at EDGE1 150 ("first computer system") to facilitate RSS at EDGE2 160 ("second computer system"), thereby improving packet processing efficiency and throughput performance. For example, at the transmit side (EDGE1 150), an outer header (i.e., unencrypted) of each encapsulated encrypted packet may be configured based on SA. This way, at the receive side (EDGE2 160), packet flows associated with different SAs may be distributed among different cores. Each SA may represent a different tunnel (e.g., IPSec tunnel).

As used herein, the term "receive-side scaling" (RSS) may refer generally to technique(s) for distributing received packet flows to different CPU cores (referred to as "cores" or "processors") for parallel processing, thereby scaling the throughput beyond the capacity of a single CPU core. The term "receive-side processing" may be used generally to include various operations performed by a computer system in response to receiving ingress encapsulated encrypted packets, including authentication, decryption, decapsulation, encapsulation, firewall, load balancing, forwarding to destination, etc. In the example in FIG. 1, EDGE2 160 may include multiple cores labelled as core1, . . . , coreN (see 161 in FIG. 1). Any number (N>1) of processors may be configured. The term "cores" may refer generally to hardware (e.g., hardware processors, CPU cores) and/or software (e.g., threads executed in parallel, virtual CPUs) capable of supporting parallel processing.

As used herein, the term "security association" (i.e., "SA") may refer generally to a set of security attribute(s) that are configured for protecting information exchange between a pair of computer systems, such as EDGE1 150 and EDGE2 160. For example, each SA may specify security attributes such as cryptographic algorithm(s), encryption/decryption key(s), authentication algorithm(s), etc. Each SA may be associated with a security parameter index (SPI), such as SPI=X for a first SA (SA1) and SPI=Y for a second SA (e.g., SA2) negotiated between EDGE1 150 and EDGE2 160. In practice, each SA and associated SPI may identify a tunnel between EDGE1 150 and EDGE2 160.

Examples of the present disclosure may be performed by any suitable "first computer system" configured to generate encapsulated encrypted packets. In the following, an example "first computer system" will be explained using EDGE1 150, which is deployed at the edge of first site 201 to facilitate communication among VMs 131-135. Depending on the desired implementation, EDGE1 150 may implement any suitable data-plane packet processing engine(s) to perform packet processing. One example is the Data Plane Development Kit (DPDK), which is an open-source Linux Foundation project that provides a set of data plane libraries and (physical or virtual) NIC drivers to accelerate fast packet processing.

Figure 3:
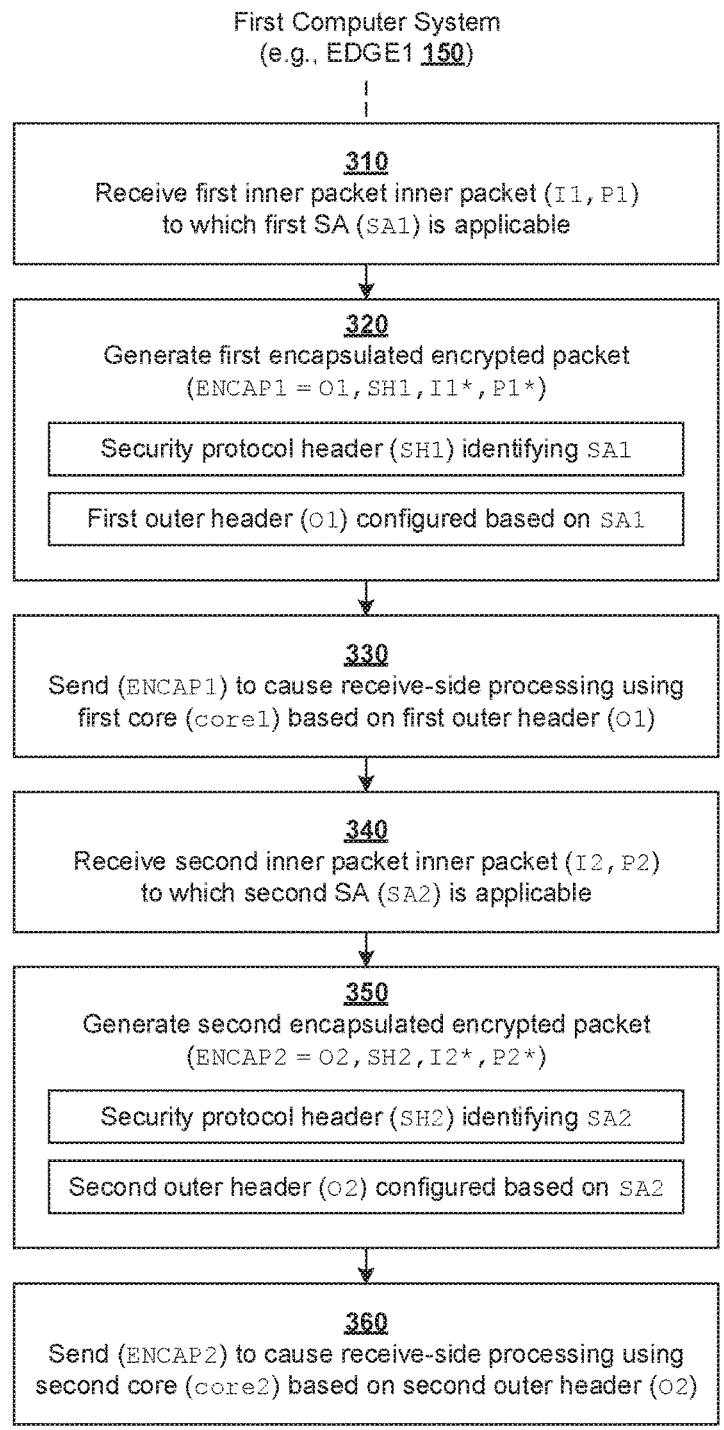
FIG. 3 is a flowchart of an example process for a computer system to perform encapsulated encrypted packet handling for RSS.

In more detail, FIG. 3 is a flowchart of example process 300 for a computer system to perform encapsulated encrypted packet handling for RSS. Example process 300 may include one or more operations, functions, or actions illustrated by one or more blocks, such as 310 to 360. The various blocks may be combined into fewer blocks, divided into additional blocks, and/or eliminated depending on the desired implementation. In the following, example process 300 will be explained using the example packet flows in FIG. 1. Throughout the present disclosure, an asterisk (*) is used to indicate encrypted packet content, such as encrypted header (e.g., I1* and I2*) and encrypted payload (e.g., P1* and P2*). The absence of the asterisk (e.g., O1, I1, P1) indicates decrypted or cleartext packet content.

At 310 and 320 in FIG. 3, in response to receiving a first inner packet (see INNER1 101 in FIG. 1) to which a first SA (SA1) is applicable, EDGE1 150 may perform encryption and encapsulation on INNER1 101. Using the example in FIG. 1, INNER1 101 having an inner header (I1) and payload (P1) may be encrypted and encapsulated. Block 320 generates a first encapsulated encrypted packet (see ENCAP1 102) represented as (O1, SH1, I1*, P1*). Here, O1=first outer header configured based on SA1, SH1=first security protocol header identifying SA1, I1*=encrypted inner header and P1*=encrypted payload. At 330 in FIG. 3, ENCAP1 102 may be forwarded towards EDGE2 160 to cause receive-side processing using a first CPU core (e.g., core1), such as decapsulation and decryption to generate a first decapsulated decrypted packet. See 101-104 in FIG. 1.

At 340 and 350 in FIG. 3, in response to receiving a second inner packet (see INNER2 105 in FIG. 1) to which a second SA (SA2) is applicable, EDGE1 150 may perform encryption and encapsulation on INNER2 105. Using the example in FIG. 1, INNER2 105 having an inner header (I2) and payload (P2) may be encrypted and encapsulated. Block 350 generates a second encapsulated encrypted packet (see ENCAP2 102) that includes (O2, SH1, I2*, P2*). Here, O2=second outer header configured based on SA2, SH2=second security protocol header identifying SA2, I2*=encrypted inner header and P2*=encrypted payload. At 360 in FIG. 3, ENCAP2 102 may be forwarded towards EDGE2 160 to cause receive-side processing using a second CPU core (e.g., core1), such as decapsulation and decryption to generate a second decapsulated decrypted packet. See 105-108 in FIG. 1.

Using examples of the present disclosure, RSS hashing may be performed based on the first outer header (O1) in ENCAP1 102 and second outer header (O2) in ENCAP2 106. Since different SAs are used, ENCAP1 102 and ENCAP2 106 may be assigned to different CPU cores for receive-side processing. For example, the outer header (O1/O2) may include an outer transport-layer protocol header (e.g., outer UDP header) that is configured based on an SPI associated with an SA, such as SPI=X for SA1 and SPI=Y for SA2. In one approach (see FIGS. 4-5), an outer source port number in the UDP header may be calculated by applying a hash function on the SPI value. In another approach (see FIGS. 4 and 6), an outer source port number in the UDP header may be calculated by applying a hash function on the SPI value and inner header information of the inner packet.

Examples of the present disclosure may be implemented to facilitate RSS hashing using "standard" NICs that are not capable of parsing and performing hashing based on a security protocol header (e.g., ESP header). For example, a "standard" NIC may perform hashing based on tuple information in the outer header (O1/O2), such as outer source IP address=IP-EDGE1, outer destination IP address=IP-EDGE2, outer source port number and outer destination port number. By configuring the outer source port number based on an SA (e.g., SPI=X for SA1 and SPI=Y for SA2), EDGE1 150 may influence EDGE2 160 to assign packet flows to different CPU cores based on their respective SAs, despite having the same outer source and destination IP addresses.

Using examples of the present disclosure, pre-cryptography RSS based on the unencrypted outer header (O1/O2) prior to subsequent cryptography processing (e.g., decryption, authentication). This allows EDGE2 160 to leverage multiple CPU cores for cryptography processing, which is usually resource intensive. A physical NIC or virtual NIC may be used. In the case of physical NIC, processing load may be distributed among physical CPU cores. In the case of virtual NIC, processing load may be distributed among virtual CPU cores. Various examples will be discussed below using FIGS. 3-6.

Tunnel Establishment and SA Negotiation

Figure 4:
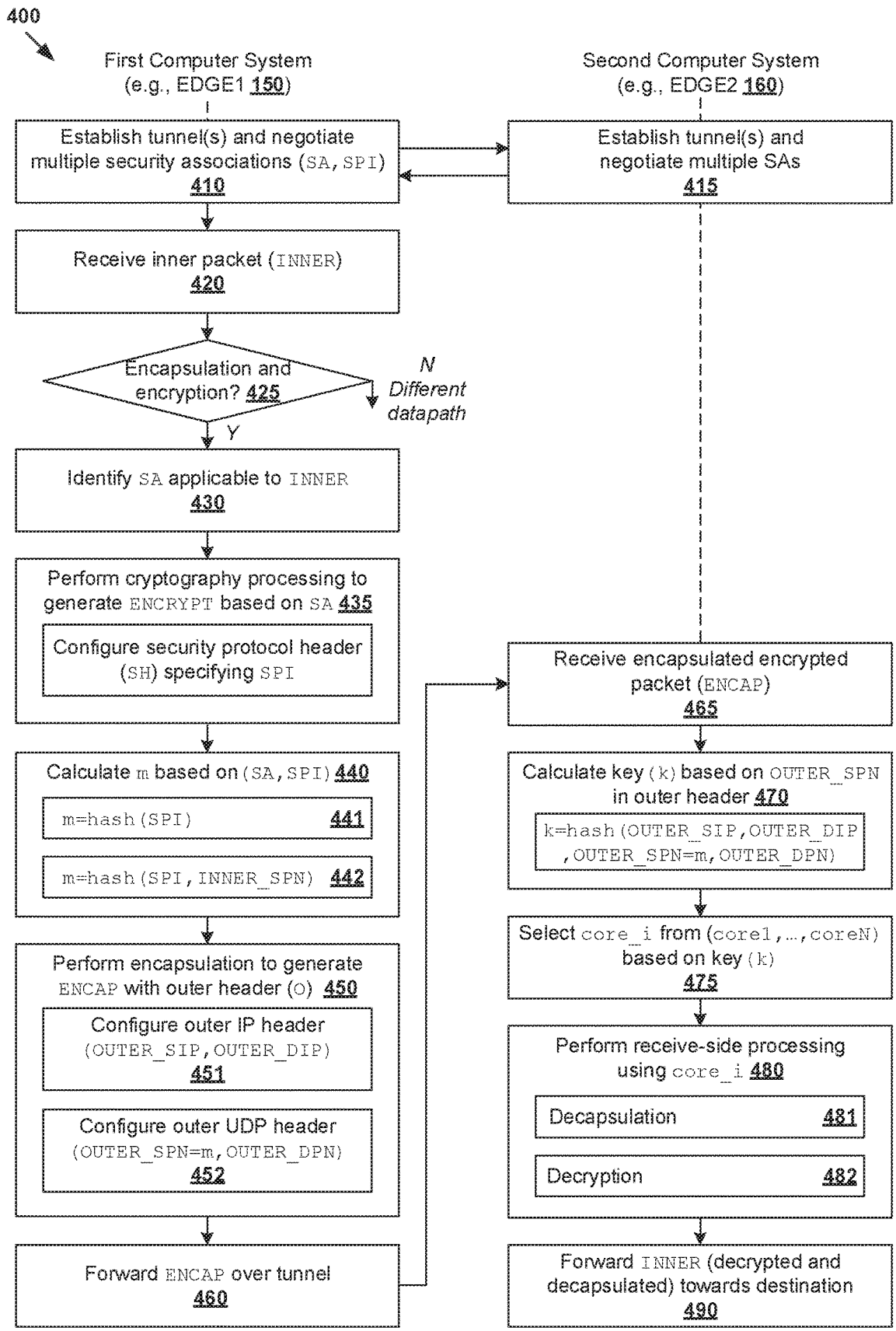
FIG. 4 is a flowchart of an example detailed process for encapsulated encrypted packet handling for RSS.

Examples of the present disclosure will now be explained using IPSec-based VPN. It should be understood that any alternative and/or additional protocol(s) may be used. In more detail, FIG. 4 is a flowchart of example detailed process 400 for a network device to perform encapsulated encrypted packet handling for RSS in SDN environment 100. Example process 400 may include one or more operations, functions, or actions illustrated by one or more blocks, such as 410 to 490. The various blocks may be combined into fewer blocks, divided into additional blocks, and/or eliminated depending on the desired implementation.

At 410-415 in FIG. 4, tunnel 180 may be established between first tunnel endpoint(s) at EDGE1 150 and second tunnel endpoint(s) at EDGE2 160 to facilitate secure communication between them. During tunnel establishment, EDGE1 150 and EDGE2 160 may establish or negotiate multiple SAs. Each SA may specify a different set of security attributes, such as cryptographic algorithms, authentication algorithms and encryption/decryption keys. For example, EDGE1 150 and EDGE2 160 may negotiate which algorithm(s) to use for encryption/decryption and data integrity check, such as advanced encryption standard (AES), secure hash algorithm (SHA), AES Galois/Counter mode (AES-GCM), etc. The SA may be established manually (e.g., static tunnel attributes) or dynamically (e.g., tunnel attributes negotiated in real time).

Using IPSec for example, an SA may be uniquely identifiable using an SPI, source and destination address information, and a security protocol such as ESP or Authentication Header (AH). Based on the SA, EDGE1 150 may perform encryption and encapsulation for egress packets originating from source endpoints (e.g., VM1 131 and VM2 132) before forwarding encapsulated encrypted packets over tunnel 180. At the receive-side at EDGE2 160, the reverse is performed. Based on the SA, EDGE2 160 to perform decryption and decapsulation before forwarding decrypted packets towards destination endpoints (e.g., VM4 134 and VM5 135). Each encapsulated encrypted packet may be padded with encryption-related data, such as ESP trailer data and ESP authentication data before being sent over tunnel 180.

To identify the SA, a security protocol header (e.g., ESP header) specifying an SPI value may be included in each encapsulated encrypted packet travelling over tunnel 180. For example, a first SA (e.g., SA1) and a second SA (e.g., SA2) may be negotiated between EDGE1 150 and EDGE2 160. In the following examples, (SA1, SPI=X) may be used for a first packet flow between VM1 131 and VM4 134 over tunnel 180. Further, (SA2, SPI=Y) may be used for a second packet flow between VM3 133 and VM5 135 over tunnel 180. In practice, information relating to SAs negotiated between may be stored in a SA database (SAD or SADB).

First Approach Based on SPI

According to examples of the present disclosure, a first approach for configuring an outer header (O1/O2) based on an SA may involve applying a hash function of an SPI associated with the SA. Using the first approach, load balancing may be performed for packet flows associated with different SAs. Some examples will be described using FIG. 4 (see 441) and FIG. 5, which is a schematic diagram illustrating first example 500 of encapsulated encrypted packet handling for RSS.

(a) Encryption (EDGE1)

At 420-425 in FIG. 4, in response to receiving an inner packet in an unencrypted form, EDGE1 150 may determine whether encryption and encapsulation is required. If not (e.g., non-IPSec packets), a different datapath may be used to process the inner packets. In the example in FIG. 5, two unencrypted inner packets are shown, i.e., first inner packet 511 (denoted as "INNER1") and second inner packet 512 (denoted as "INNER2"). Each inner packet 511/512 may include an inner header (I1/I2) and cleartext payload information (P1/P2).

For the first packet flow between source VM1 131 and destination VM4 134, a first inner header (I1) may include an IP header specifying inner address information (source IP address=IP-VM1, destination IP address=IP-VM4). A TCP/UDP header of INNER1 511 may specify transport-layer information, such as an inner source port number and a destination port number. For the second packet flow between source VM2 132 and destination VM5 135, a second inner header (I2) may include an IP header specifying inner address information (source IP address=IP-VM2, destination IP address=IP-VM5). A TCP/UDP header of INNER2 512 may specify an inner source port number and a destination port number.

At 430-435 in FIG. 4, EDGE1 150 may identify an SA that is applicable to an inner packet and perform cryptography processing based on the SA. This way, an encrypted packet with a security protocol header (e.g., ESP header) is generated. The applicable SA may be identified based on a policy rule that may be matched to characteristic(s) of each packet flow, such as IP addresses, port numbers, protocol, etc. For INNER1 511, a first policy rule assigns SA1 to the first packet flow between VM1 131 and VM4 134 such that cryptography processing may be performed based on (SA1, SPI=X). For INNER2 512, a second policy rule assigns SA2 to the second flow between VM2 132 and VM5 135 such that cryptography processing may be performed based on (SA2, SPI=Y). Depending on the desired implementation, block 435 may involve EDGE1 150 applying authentication and encryption algorithm(s) to convert first unencrypted inner packet to a first encrypted packet. Different SAs may have different security attributes to satisfy different application needs.

Figure 5:
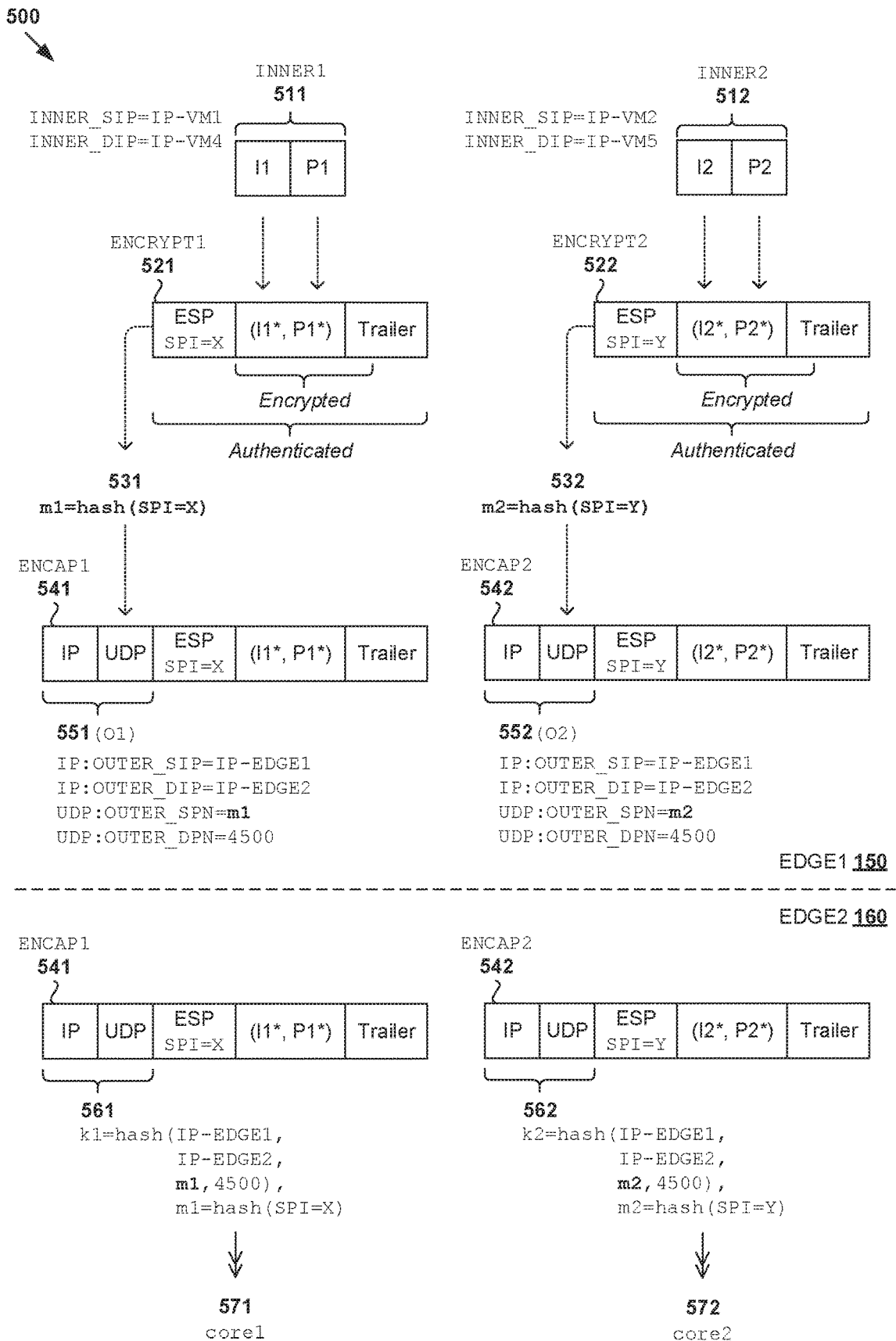
FIG. 5 is a schematic diagram illustrating a first example of encapsulated encrypted packet handling for RSS.

In the example in FIG. 5, two resulting encrypted packets are shown, i.e., first encrypted packet 521 (see "ENCRYPT1") and second encrypted packet 522 (see "ENCRYPT2"). In particular, ENCRYPT1 521 may include INNER1 511 in an encrypted form (see I1*, P1*) as well as a first ESP header identifying SA1 (see SPI=X). Similarly, ENCRYPT2 522 may include INNER1 512 in an encrypted form and a second ESP header identifying SA2 (e.g., using SPI=Y). Each ESP header is in a cleartext form. Note that encrypted packets 521-522 may also include any other information, such as "trailer" representing an ESP trailer and an authentication trailer.

For ENCRYPT1 521, bits in inner header (I1) and inner payload (P1) may be transformed, scrambled or mixed together in any suitable manner during encryption to generate encrypted payload (I1*, P1*). The same applies to ENCRYPT2 522 that includes encrypted payload (I2*, P2*). Comparing the pre-encryption INNER1 511 and post-encryption (I1*, P1*), their length may remain the same using algorithms such as authenticated encryption with Galois/Counter mode (AES-GCM), etc.

(b) Encapsulation (EDGE1)

At 440 in FIG. 4, EDGE1 150 may generate a hash value based on the SA identified at block 430. For the first packet flow in FIG. 5, EDGE1 150 may generate a first hash value (m1) by applying a hash function on any suitable information identifying SA1, such as m1=hash(X) using SPI=X (see 531). For the second packet flow, a second hash value (m2) may be generated as m2=hash(Y) using SPI=Y identifying SA2 (see 532). In practice, any suitable hash function hash( ) may be used at blocks 440-441. Note that block 442 will be discussed below using FIG. 6.

At 450-460 in FIG. 4, EDGE1 150 may generate and send an encapsulated encrypted packet that includes the hash value towards EDGE2 160 over tunnel 180. In the example in FIG. 5, first encapsulated encrypted packet 541 (see "ENCAP1") may be generated by encapsulating "ENCRYPT1" 521 with an outer header (see "O1" 551). First outer header 551 may include an outer IP header specifying source IP address=IP-EDGE1 (see "OUTER_SIP") associated with a first tunnel endpoint at EDGE1 150, and destination IP address=IP-EDGE2 (see "OUTER_DIP") associated with a second tunnel endpoint at EDGE2 160. Similarly, for the second packet flow, second encapsulated encrypted packet 542 (see "ENCAP2") may be generated by encapsulating "ENCRYPT2" 521 with a second outer header (see "O2" 562). Second outer header 552 specifies the same (OUTER_SIP=IP-EDGE1, OUTER_DIP=IP-EDGE2). See also 451 in FIG. 4.

To facilitate pre-cryptography RSS, outer header 551/552 may further include an outer transport-layer header specifying an outer source port number (see "OUTER_SPN") and outer destination port number (see "OUTER_DPN"). According to block 441, the outer source port number may be set to m1=hash(SPI=X) associated with SA1 for the first packet flow. For the second packet flow, the outer source port number may be set to m2=hash(SPI=Y) associated with SA2. In practice, block 450 may involve inserting an outer UDP header (e.g., 8 bytes) between an outer IP header and an ESP header. By adding the outer UDP header, information relating to the underlying SA may be exposed to a standard RSS hash logic at EDGE2 160. This way, based on the hash values (m1,m2), EDGE1 150 may influence RSS hashing at EDGE2 160 to distinguish between different SAs. See also 452 in FIG. 4.

Compared to TCP, a UDP header is generally simpler to implement, being less CPU costly. Since UDP header is shorter than TCP header, UDP header processing also consumes less network bandwidth, thereby suitable for RSS load balancing. In general, there will be an additional overhead of an 8-byte outer UDP header, as well as potentially slightly increased UDP encapsulation/decapsulation cost at both the transmit and receive sides. However, there will be efficiency gain from triggering multi-core processing capability at EDGE2 160 based on hash value in outer UDP header. Note that block 450 does not introduce a security leak because (conventional) ESP header 521 already includes SPI=X in cleartext form.

Depending on the desired implementation, the outer destination port number ("OUTER_DPN") in outer UDP header may be set to 4500 according to any suitable approaches defined in the Internet Engineering Task Force (IETF) Request for Comments (RFC) 3947 and 4306. In particular, RFC 3947 relates to "Negotiation of network address translation (NAT) traversal in the Internet key exchange (IKE)" and RFC 4306 to "Internet key exchange (IKEv2) protocol." Other UDP header information, such as length and checksum (not shown) may be set according to any suitable approach. In practice, block 450 may be enabled or disabled by a user (e.g., network administrator) depending on data center requirements.

(c) RSS Processing (EDGE2)

At 465-470 in FIG. 4, in response to receiving an ingress packet, EDGE2 160 may calculate an RSS key based on the hash value in outer header 551/561. Based on OUTER_SPN=m1 in ENCAP1 541, a first key (k1) may be calculated by applying a hash function on (IP-EDGE1, IP-EDGE2, OUTER_SPN=m1, OUTER_DPN=4500) in outer header 551. Any suitable hash function may be used here. Based on OUTER_SPN=m2 in ENCAP2 542, a second key (k2) may be calculated by applying a hash function on (IP-EDGE1, IP-EDGE2, OUTER_SPN=m2, OUTER_DPN=4500) in outer header 552. Keys (k1, k2) should have different values due to respective (m1, m2) in outer header 551/552. Note that it is not necessary for EDGE2 160 to use non-standard RSS hashing approach to parse the ESP header in ENCAP1 541 or ENCAP2 542.

At 475 in FIG. 4, EDGE2 160 may select a particular corei from the set of [core1, core2, . . . , coreN] based on the key calculated at block 470. For example in FIG. 5, a first core (core1) may be selected to process ENCAP1 541 based on the first key (k1) that is calculated based on m1=hash(SPI=X). Subsequent packets from the first packet flow may be assigned to the same core1. A second core (core2) may be selected to process ENCAP2 542 based on the second key (k2) that is calculated based on m2=hash(SPI=Y). Subsequent packets from the second packet flow may be assigned to the same core2.

(d) Decapsulation and Decryption (EDGE2)

At 480 in FIG. 4, EDGE2 160 may perform receive-side processing that includes decapsulation and cryptography operations for encapsulated encrypted packets using corei selected at block 475. Depending on the desired implementation, blocks 480 may also involve decapsulation (see 481), decryption (see 482) and other IPSec-related processing, such as checking a replay window, etc. In practice, any other packet information (header or trailer) may be removed before being forwarded towards the destination. Based on ENCAP1 541, a first decapsulated and unencrypted packet may be generated and forwarded towards VM4 134 according to block 490. Based on ENCAP2 542, a second decapsulated and unencrypted packet may be generated and forwarded towards VM5 135. Note that a different datapath (not shown) may be used for non-IPSec ingress packets received by EDGE2 160.

Second Approach: SPI and Inner Packet Information

According to examples of the present disclosure, a second approach for configuring an outer header (O1/O2) may involve applying a hash function on (a) SPI associated with the SA and (b) inner header information from an inner packet (INNER). Using the first approach in FIG. 5, load balancing may be performed for packet flows associated with different SAs. Additionally, using the second approach in FIG. 6, RSS may be further improved to not only distribute packet flows associated with different SAs to different cores, but also providing load balancing for different packet flows associated with the same SA. This may further improve RSS performance, for example as if no IPSec encapsulation/encryption is applied to cleartext packets.

Figure 6:
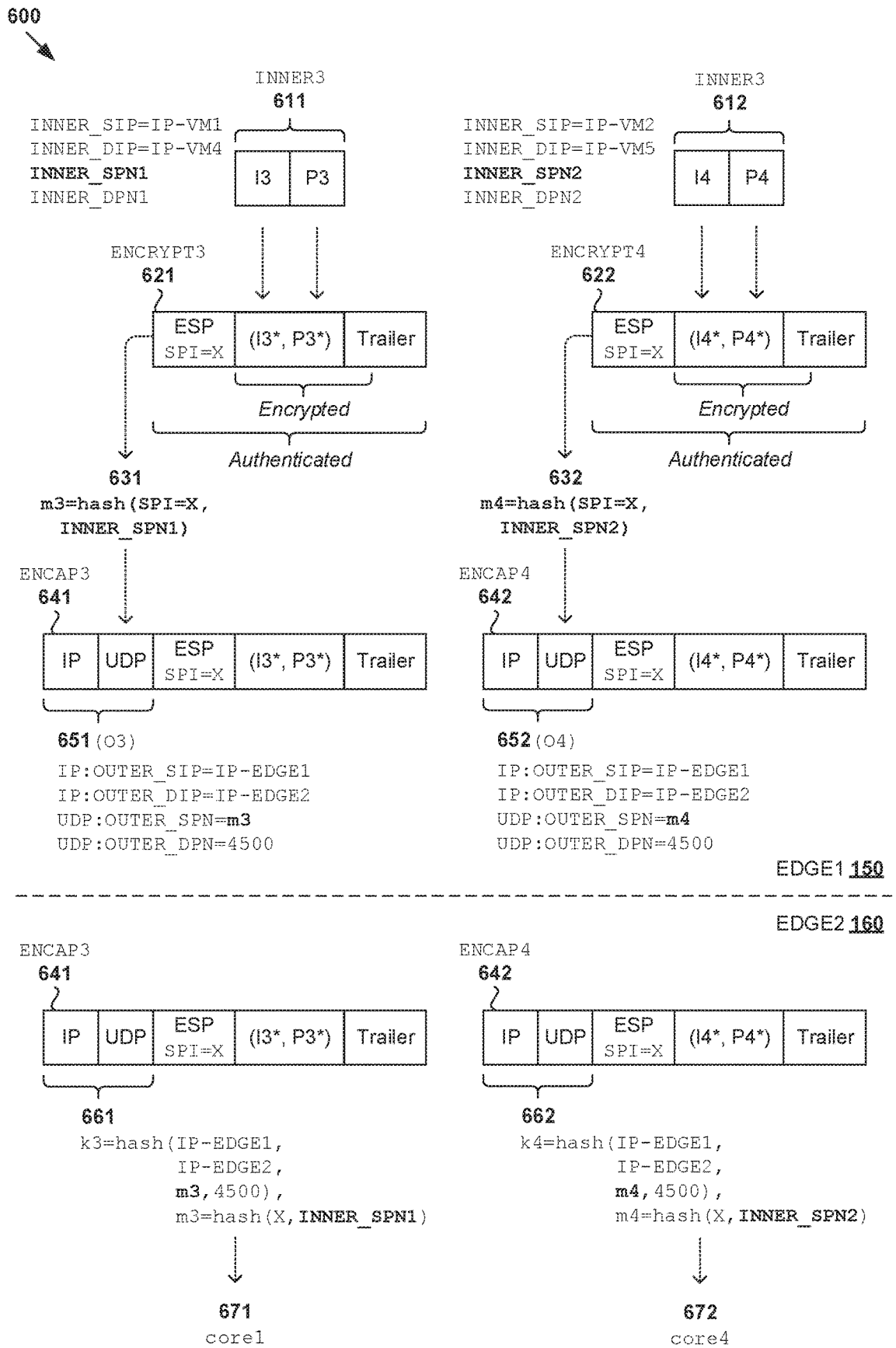
FIG. 6 is a schematic diagram illustrating a second example of encapsulated encrypted packet handling for RSS.

Similar to FIG. 5, the example in FIG. 6 does not necessitate any changes to standard RSS hash logic that is capable of hashing based on unencrypted IP/UDP/TCP headers in the outer header. Some examples will be described using FIG. 6, which is a schematic diagram illustrating second example 600 of encapsulated encrypted packet handling for RSS. In the following, implementation details (e.g., relating to cryptography processing as well as encapsulation/decapsulation) discussed using FIG. 5 are also applicable to the example in FIG. 6 and will not be repeated here for brevity. See also 442 in FIG. 4.

For a first packet flow between VM1 131 and VM4 134, a hash value (m3) may be calculated by applying a hash function on (a) SPI=X identifying SA1 and (b) inner header information from INNER3 611. For example (see 631), m3=hash(SPI=X, INNER_SPN1) may be calculated, where INNER_SPN1 is an inner UDP/TCP source port number in an inner header (I3) of INNER3 611. During encapsulation, EDGE1 150 may generate ENCAP3 641 by encapsulating ENCRYPT3 621 with an outer header (O3) specifying OUTER_SPN=m3 (see 631/651). This is to cause EDGE2 160 to assign ENCAP3 641 to a first core (e.g., core1) for receive-side processing. Core assignment may be performed based on a key, k3=hash(IP-EDGE1, IP-EDGE2, OUTER_SPN=m3, OUTER_DPN=4500). See 661 and 671 in FIG. 6.

For a second packet flow between VM2 132 and VM5 135, a hash value (m4) may be calculated by applying a hash function on (a) SPI=X identifying the same SA1 and (b) inner header information from INNER4 612. For example (see 632), m4=hash(SPI=X, INNER_SPN2) may be calculated, where INNER_SPN2 is an inner UDP/TCP source port number in an inner header (I4) of INNER4 612. During encapsulation, EDGE2 150 may generate ENCAP4 642 by encapsulating ENCRYPT4 622 with an outer header (O4) 652 specifying OUTER_SPN=m4 (see 632/652). This is to cause EDGE2 160 to assign ENCAP4 642 to a different core (e.g., core4) for receive-side processing. Core assignment may be performed based on key k4=hash(IP-EDGE1, IP-EDGE2, OUTER_SPN=m4, OUTER_DPN=4500). See 662 and 672 in FIG. 6.

The examples in FIG. 6 may be implemented to achieve a full or near-full scaling capability (e.g., on par with scaling capability of the encryption side), thereby improving over the example in FIG. 5. Using the hash value calculation at block 442, entropy relating to the original unencrypted packet (e.g., INNER3 611 and INNER4 612) and SPI value may be exposed to the RSS hash logic at EDGE2 160. Since the TCP/UDP port number in inner packet 611/612 identifies the associated packet flow to a large extent, the example in FIG. 6 may approach or achieve full scaling of parallel processing on IPSec traffic on the receive side using standing RSS hash logic. Note that the hash function at block 442 may be a one-way operation and the entropy on the inner source port number is reduced after applying a hash function. As such, the security risk associated with a potential attacker reversing the hash calculation from (m3, m4) is relatively low.

Although explained using EDGE1 150, it should be understood that EDGE2 160 may implement the examples of the present disclosure to perform encapsulated encrypted packet handling for RSS on the reverse path, such as from VM4 134 to VM1 131. In practice, EDGE1 150 and/or EDGE2 160 may be configured to provide any suitable networking services, such as to provide routing, firewall, policy-based routing, and NAT. If flow cache is enabled on EDGE1 150, a match-action type of processing may be implemented. This involves performing a lookup in a flow cache table and, if there is a match, the associated action(s). By performing load balancing or core selection according to examples of the present disclosure, processing load may be distributed more efficiently among multiple cores.

Container Implementation

Although discussed using VMs 131-135, it should be understood that encapsulated encrypted packet handling for RSS may be performed for other virtualized computing instances, such as containers, etc. The term "container" (also known as "container instance") is used generally to describe an application that is encapsulated with all its dependencies (e.g., binaries, libraries, etc.). For example, multiple containers may be executed as isolated processes inside VM1 131, where a different VNIC is configured for each container. Each container is "OS-less", meaning that it does not include any OS that could weigh 11s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. Using the examples in FIG. 1 to FIG. 6, encapsulated encrypted packet handling may be performed for traffic to/from containers located at geographically-dispersed sites in SDN environment 100.

Computer System

The above examples can be implemented by hardware (including hardware logic circuitry), software or firmware or a combination thereof. The above examples may be implemented by any suitable computing device, computer system, etc. The computer system may include processor(s), memory and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 6. For example, a first computer system capable of acting as EDGE1 150 and a second computer system capable of acting as EDGE2 160 may be deployed in SDN environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processor, ASIC, logic, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

We claim:

1. A method for a first computer system to perform encapsulated encrypted packet handling for receive-side scaling (RSS), wherein the method comprises:
   in response to receiving a first inner packet to which a first security association is applicable,
      performing encryption and encapsulation on the first inner packet to generate a first encapsulated encrypted packet that includes (a) a first security protocol header identifying the first security association and (b) a first outer header configured based on the first security association;
      forwarding the first encapsulated encrypted packet towards a second computer system to cause receive-side processing using a first core of the second computer system based on the first outer header; and in response to receiving a second inner packet to which a second security association is applicable,
  performing encryption and encapsulation on the second inner packet to generate a second encapsulated encrypted packet that includes (a) a second security protocol header identifying a second security association and (b) a second outer header configured based on the second security association;
  forwarding the second encapsulated encrypted packet towards the second computer system to cause receive-side processing using a second core of the second computer system based on the second outer header.

2. The method of claim 1, wherein performing the encryption and encapsulation on the first inner packet comprises:
  configuring the first outer header to include an outer transport-layer protocol header that is configured based on an identifier associated with the first security association.

3. The method of claim 2, wherein performing the encryption and encapsulation on the first inner packet comprises:
  calculating an outer source port number of the outer transport-layer protocol header by applying a hash function on the identifier, wherein the identifier is a security parameter index (SPI) associated with the first security association.

4. The method of claim 1, wherein performing the encryption and encapsulation on the first inner packet comprises:
  inserting a user datagram protocol (UDP) header, being the outer transport-layer protocol header, between an outer Internet Protocol (IP) header and the first security protocol header.

5. The method of claim 1, wherein performing the encryption and encapsulation on the first inner packet comprises:
  configuring the first outer header to include an outer transport-layer protocol header that is configured based on (a) a first identifier associated with the first security association and (b) inner header information of the first inner packet.

6. The method of claim 2, wherein performing the encryption and encapsulation on the first inner packet comprises:
  calculating an outer source port number of the outer transport-layer protocol header by applying a hash function on (a) a security parameter index (SPI), being the first identifier, associated with the first security association and (b) an inner source port number of the first inner packet.

7. The method of claim 1, wherein the method comprises:
  prior to receiving the first inner packet and the second inner packet, establishing a tunnel with the second computer system and negotiating multiple security associations that include the first security association and the second security association over the tunnel.

8. A non-transitory computer-readable storage medium that includes a set of instructions which, in response to execution by a processor of a computer system, cause the processor to perform a method of encapsulated encrypted packet handling for receive-side scaling (RSS), wherein the method comprises:
  in response to receiving a first inner packet to which a first security association is applicable,
    performing encryption and encapsulation on the first inner packet to generate a first encapsulated encrypted packet that includes (a) a first security protocol header identifying the first security association and (b) a first outer header configured based on the first security association;
    forwarding the first encapsulated encrypted packet towards a second computer system to cause receive-side processing using a first core of the second computer system based on the first outer header; and
  in response to receiving a second inner packet to which a second security association is applicable,
    performing encryption and encapsulation on the second inner packet to generate a second encapsulated encrypted packet that includes (a) a second security protocol header identifying a second security association and (b) a second outer header configured based on the second security association;
    forwarding the second encapsulated encrypted packet towards the second computer system to cause receive-side processing using a second core of the second computer system based on the second outer header.

9. The non-transitory computer-readable storage medium of claim 8, wherein performing the encryption and encapsulation on the first inner packet comprises:
  configuring the first outer header to include an outer transport-layer protocol header that is configured based on an identifier associated with the first security association.

10. The non-transitory computer-readable storage medium of claim 9, wherein performing the encryption and encapsulation on the first inner packet comprises:
  calculating an outer source port number of the outer transport-layer protocol header by applying a hash function on the identifier, wherein the identifier is a security parameter index (SPI) associated with the first security association.

11. The non-transitory computer-readable storage medium of claim 8, wherein performing the encryption and encapsulation on the first inner packet comprises:
  inserting a user datagram protocol (UDP) header, being the outer transport-layer protocol header, between an outer Internet Protocol (IP) header and the first security protocol header.

12. The non-transitory computer-readable storage medium of claim 8, wherein performing the encryption and encapsulation on the first inner packet comprises:
  configuring the first outer header to include an outer transport-layer protocol header that is configured based on (a) a first identifier associated with the first security association and (b) inner header information of the first inner packet.

13. The non-transitory computer-readable storage medium of claim 9, wherein performing the encryption and encapsulation on the first inner packet comprises:
  calculating an outer source port number of the outer transport-layer protocol header by applying a hash function on (a) a security parameter index (SPI), being the first identifier, associated with the first security association and (b) an inner source port number of the first inner packet.

14. The non-transitory computer-readable storage medium of claim 8, wherein the method comprises:
  prior to receiving the first inner packet and the second inner packet, establishing a tunnel with the second computer system and negotiating multiple security associations that include the first security association and the second security association over the tunnel.

15. A computer system, being a first computer system, comprising:
- a processor; and
- a non-transitory computer-readable medium having stored thereon instructions that, when executed by the processor, cause the processor to:
- in response to receiving a first inner packet to which a first security association is applicable,
  - perform encryption and encapsulation on the first inner packet to generate a first encapsulated encrypted packet that includes (a) a first security protocol header identifying the first security association and (b) a first outer header configured based on the first security association;
  - forward the first encapsulated encrypted packet towards a second computer system to cause receive-side processing using a first core of the second computer system based on the first outer header; and
- in response to receiving a second inner packet to which a second security association is applicable,
  - perform encryption and encapsulation on the second inner packet to generate a second encapsulated encrypted packet that includes (a) a second security protocol header identifying a second security association and (b) a second outer header configured based on the second security association;
  - forward the second encapsulated encrypted packet towards the second computer system to cause receive-side processing using a second core of the second computer system based on the second outer header.

16. The computer system of claim 15, wherein the instructions for performing the encryption and encapsulation on the first inner packet comprises:
- configure the first outer header to include an outer transport-layer protocol header that is configured based on an identifier associated with the first security association.

17. The computer system of claim 16, wherein the instructions for performing the encryption and encapsulation on the first inner packet comprises:
- calculate an outer source port number of the outer transport-layer protocol header by applying a hash function on the identifier, wherein the identifier is a security parameter index (SPI) associated with the first security association.

18. The computer system of claim 15, wherein the instructions for performing the encryption and encapsulation on the first inner packet comprises:
- insert a user datagram protocol (UDP) header, being the outer transport-layer protocol header, between an outer Internet Protocol (IP) header and the first security protocol header.

19. The computer system of claim 15, wherein the instructions for performing the encryption and encapsulation on the first inner packet comprises:
- configure the first outer header to include an outer transport-layer protocol header that is configured based on (a) a first identifier associated with the first security association and (b) inner header information of the first inner packet.

20. The computer system of claim 16, wherein the instructions for performing the encryption and encapsulation on the first inner packet comprises:
- calculate an outer source port number of the outer transport-layer protocol header by applying a hash function on (a) a security parameter index (SPI), being the first identifier, associated with the first security association and (b) an inner source port number of the first inner packet.

21. The computer system of claim 15, wherein the instructions further cause the processor to:
- prior to receiving the first inner packet and the second inner packet, establish a tunnel with the second computer system and negotiating multiple security associations that include the first security association and the second security association over the tunnel.

* * * * *